July 2, 1929.  S. J. FINN  1,719,175
COATING SYSTEM
Filed April 10, 1924    2 Sheets-Sheet 2
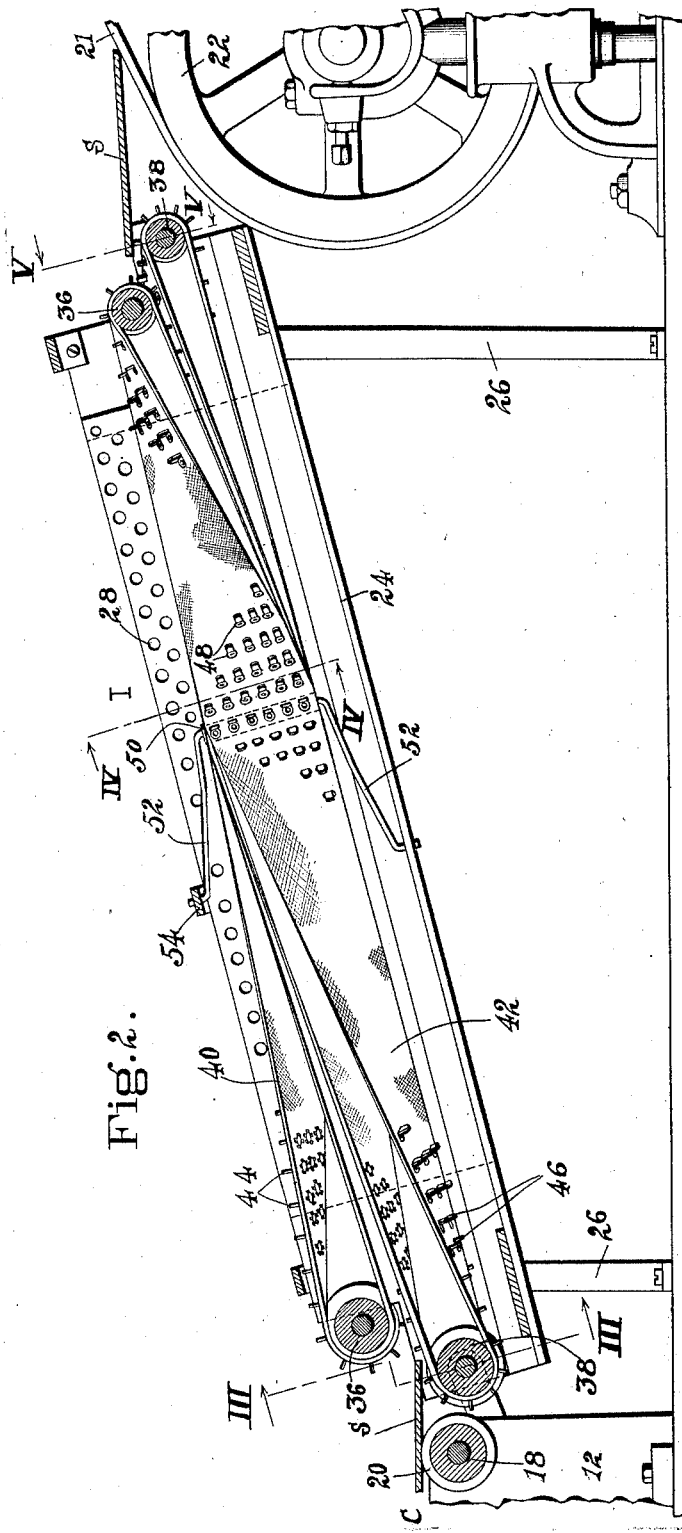
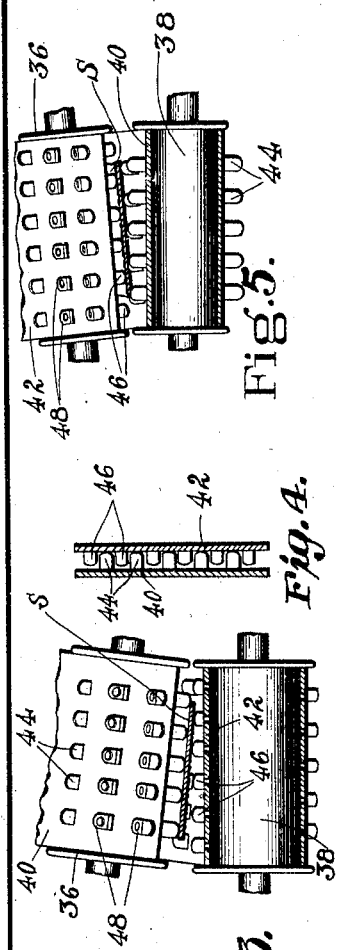

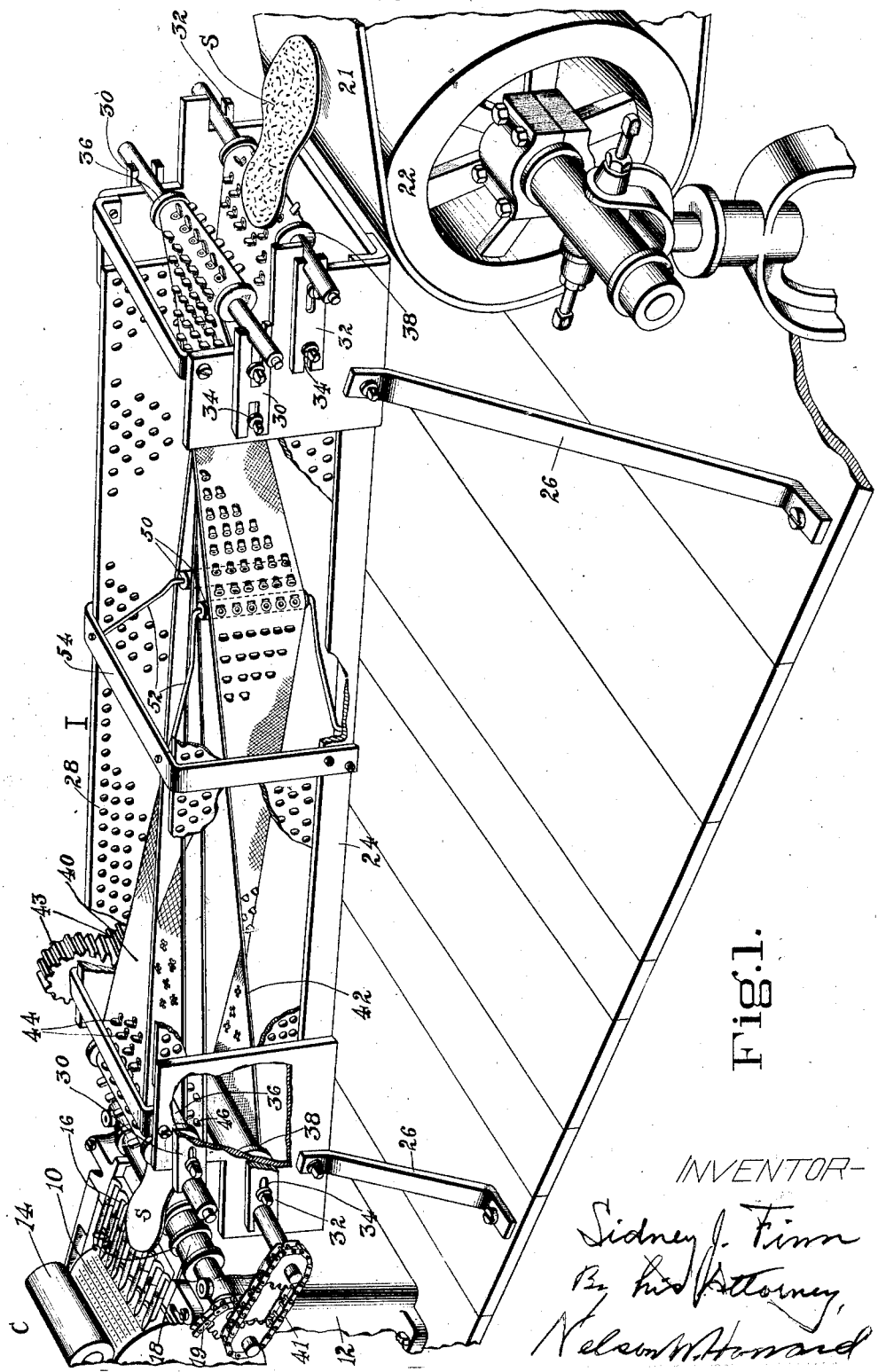

Patented July 2, 1929.

1,719,175

UNITED STATES PATENT OFFICE.

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY.

COATING SYSTEM.

Application filed April 10, 1924. Serial No. 705,695.

This invention relates to systems for coating objects, as sole-portions of shoes. It is more particularly concerned with the prevention of the adhesion of the objects to surfaces which receive or convey them immediately after their coating has been applied.

A feature of my invention involves the reception of objects from the coating machine between endless conveyors or belts guided in a novel manner, which invert and advance them in the direction of delivery from the machine. The thus-inverted objects which have been coated upon one side may be in this manner deposited upon the receiving surface with the coated side upmost, so there will be no adhesion to the support. The inverting conveyors have adjacent cooperating runs, which carry the objects between them, these conveyors turning through substantially 180 degrees between the receiving end and the delivery-end.

As a further feature of the invention, contact of the coated objects with the surfaces of the conveyors is prevented by means, as projections, which are spaced both longitudinally and transversely of each conveyor, extending therefrom toward the companion conveyor and intercurrent with the projections thereof. By this means, the area of the coated portions of the objects by which they are supported is so small that there is little tendency to adhere, and the objects are freely discharged from the conveyors and without the removal from them of any material amount of the coating. As herein illustrated, the contact-preventing means, which is carried upon one of the conveyors, is maintained out of engagement with the other conveyor. This may be effected by making the projections upon the two conveyors of different lengths.

One of the several forms which my invention may assume is illustrated in the accompanying drawings, Fig. 1 representing, in perspective, the more essential portions of my improved system;

Fig. 2 being a side elevation thereof, with parts of the enclosing elements broken away; and Figs. 3, 4 and 5 successive transverse sections, somewhat enlarged, on the lines III—III, IV—IV and V—V, respectively, of Fig. 2.

At C appears a portion of a coating machine, which may be such as is employed for cementing the sole-portions of shoes of the tennis type. This apparatus includes an applying roll 10 receiving cement from a tank 12, in which it rotates; there co-operating with the roll 10 a pressure-roll 14, which serves to hold the work against the applying roll for the reception of its coating. The coated work-pieces are discharged from the bite of the rolls across a supporting grid 16 to a delivery-roll 18, which is rotated in a clockwise direction, as viewed in Fig. 2 of the drawings, by sprocket-gearing 19 from the cementing machine. This delivery-roll may have peripheral ribs or enlargements 20, so that the extent of the surface with which the coated sides of the soles contact is reduced.

After coating, it is desired that the soles shall be carried forward for a considerable time, with the coated sides upmost until the cement is partially set. This is best accomplished by a long conveyor-belt 21, only one extremity of which is shown, with its supporting roll 22. The conveyor 21 is alined, as to its travel, with the direction of delivery from the machine C, so that the advance of the soles continues in one direction from the time of introduction of the soles to the cementer until they are removed from the conveyor. Since this machine delivers the soles with their coated sides down, and it is desired that they shall be carried by the conveyor with the coated sides up, to prevent adhesion and facilitate the drying action, the conveyor 21 is spaced from the cementing machine, and there is interposed between them an inverting mechanism I. This may include a skeleton frame 24 mounted upon pairs of legs 26, which are of such length as to incline the frame upwardly from the cementing machine to the conveyor. To serve as a guard about the movable elements of the inverting mechanism, perforated plates 28 attached to the frame 28 surround them. Mounted at opposite extremities of the frame are upper pairs of bearing blocks 30, 30, the blocks of each pair being alined with each other transversely of the frame, and lower pairs 32, 32 similarly arranged. Each block may be held upon the frame by a slot-and-screw connection 34, so that those at one end of the frame may be adjusted toward and from the opposite pairs. Journaled in the blocks 30 and 32 are pairs of rolls 36, 36 and 38, 38, respectively, the axes of these rolls being parallel to that of the applying roll 10. Over the upper roll 36, at the receiving end of the inverting mechanism, and the lower roll 38, at the delivery-end, and over the corresponding lower and upper rolls, run endless crossed conveyor-belts 40 and 42, respectively. These, in passing from one extremity of the frame to the other, turn through substantially 180 degrees, so that the upper and lower runs of each are reversed in their relation to the horizontal. Throughout their lengths, the inner runs are closely adjacent, and are spaced by approximately equal distances throughout. The forward extremities of the work-pieces are delivered by the roll 18 into this space, with the coated sides at the bottom, as appears at the left of Fig. 3. The belt 42 is driven clockwise from the shaft of the roll 18 (Fig. 2) by sprocket-gearing 41 acting upon the roll 38 at the receiving end of the inverting mechanism, while the belt 40 is caused to travel in the opposite direction by equal-ratio gearing 43 connecting this roll 38 with the upper roll 36. Consequently, the closely spaced adjacent sides travel in the same direction and at the same speed, opposite areas remaining in registration during this movement. As the pieces are advanced between these inner adjacent runs of the belt, they are gradually shifted with the crossing of the belts, and are finally completely inverted, as appears at the right of Fig. 3, so that when they emerge at the delivery-end of the mechanism, they are discharged upon the conveyor 21 with the cemented sides up.

To prevent contact with the conveying surfaces of the belts 40 and 42 of the sides of the soles coated by the roll 10, or with any drops of cement which have overrun the edges or otherwise get upon the opposite sides, there are, extending outwardly, longitudinal series of projections 44 and 46 from the belts 40 and 42, respectively. These projections may be of metal, in the form of relatively thin fingers, flattened transversely of the belts, being spaced both longitudinally and transversely thereof. They are secured to said belts by angular portions 48, which are riveted thereto. The series are shown as different in number, there being five of these upon the belt 40 and six upon the belt 42. The series upon the respective belts are staggered with relation to each other; that is, except for the outer series of projections upon the belt 42, each is intercurrent with those upon the opposite belt. This insures firm engagement of the ends of the projections with the soles, so there is no possibility of displacement during the transfer from the cementing machine to the conveyor 21. The belts may be kept properly tensioned, to maintain the correct relation of the projections, by adjustment of the bearing blocks 30 and 32. It is to be noted that the upper projections 44 are longer than those from the lower belt. The former are the ones which contact with the normally uncoated sides of the soles, so that, unless there is overrunning of the cement, they do not become even lightly smeared with it. On account of their greater length, these projections 44 engage the belt 42 and hold the projections 46 clear of the belt 40. As a result of this, no cement is transferred to the belt 40 from the projections contacting with the coated sides.

Between the end supporting rolls 36 and 38 of the belts I prefer to provide guide-rolls 50, 50, preferably located at the turning points, so that their axes lie vertically. These rolls may be rotatable upon arms 52 pivoted upon a bar 54 extending across the top of the frame 24. Each roll 50 lies between and guides the opposite sides of a belt, serving to separate them, so that the engagement of the oppositely moving surfaces may not interfere with their travel.

To outline briefly the general operation of the system, sole-portions S are introduced by the operator between the applying roll 10 and pressure-roll 14, receiving upon their under sides a coating from the former and being advanced over the grid 16 upon the roll 18, which delivers them between the conveyors 40 and 42. As the soles enter the space between these conveyors, they are engaged by the projections 44 and 46, the series of which have been running between those upon the opposite belt. The introduction of the soles separates these projections, which thereby grip said soles firmly. Wherever these projections may contact with the freshly applied coating, there is little tendency to remove this by the metallic surfaces of comparatively slight area. The coated surface between the projections is left entirely undisturbed and fully exposed to the drying effect of the air. Traveling in this way, the soles are gradually reversed in position, until, at the delivery-end of the conveyors, the coated sides are upmost and the soles are deposited with the uncoated sides upon the conveyor 21, by which they are carried through such a distance that they become sufficiently dried for booking or other disposition.

Having described my invention, what I claim as new and desire to secure by Letters Patent of the United States is:

1. The combination with a coating machine, of two endless belts having adjacent co-operating runs arranged to receive between them coated objects from the machine, said belts turning through substantially 180 degrees between the receiving ends and delivery-ends, and guides contacting with the belts approximately midway of the turn and arranged to separate said belts.

2. The combination with a coating machine, of two endless belts having adjacent co-operating runs arranged to receive between them coated objects from the machine, said belts turning through substantially 180 degrees between the receiving ends and delivery-ends, and guide-rolls contacting with the runs of both belts opposite those engaging the objects and intermediate the ends.

3. The combination with a coating machine, of opposite endless conveyors arranged to receive between them and invert coated objects from the machine, there being means spaced from one another both longitudinally and transversely of the conveyors for preventing contact of the objects with the bodies of said conveyors.

4. The combination with a coating machine, of opposite endless conveyors, each having projections extending toward the companion conveyor, said projections being normally intercurrent and arranged to contact with and be separated by objects delivered by the coating machine.

5. The combination with a coating machine, of opposite endless conveyors arranged to receive objects therefrom and each having projections extending toward the companion conveyor, said projections being arranged in longitudinal series staggered with respect to the series of the opposite conveyor.

6. The combination with a coating machine, of two endless belts having adjacent co-operating runs provided with projections spaced from one another longitudinally and transversely of the belts and arranged to contact with opposite sides of coated objects delivered by the machine, said belts turning through substantially 180 degrees between the receiving ends and delivery-ends.

7. The combination with a coating machine, of two endless belts having adjacent co-operating runs provided with projections spaced from one another longitudinally and transversely of the belts and arranged to contact with opposite sides of coated objects delivered by the machine, said belts turning through substantially 180 degrees between the receiving ends and delivery-ends, and guide-rolls contacting with the sides of the belts opposite the projections and arranged to space the opposite runs of each belt.

8. In a system for coating soles, a cementing machine, a conveyor spaced from the machine and traveling in the direction of delivery therefrom, and opposite belts interposed between the cementing machine and the conveyor and having oppositely extending projections spaced from one another longitudinally and transversely of each belt, the projections being arranged to contact at their points with soles discharged from the machine and deliver them to the conveyor, said belts turning through substantially 180 degrees between the receiving and delivery-ends.

9. The combination with a coating machine, of opposite endless conveyors arranged to receive between them and invert coated objects from the machine, there being means carried by both conveyors for preventing contact of the objects with the bodies of the conveyors, such contact-preventing means of one conveyor being maintained out of engagement with the other conveyor while said other conveyor engages the contact-preventing means of the companion conveyor.

10. The combination with a coating machine, of opposite endless conveyors each having projections extending toward the companion conveyor, said projections being arranged to contact with opposite sides of the objects delivered by the coating machine and being of different lengths upon the two conveyors, the longer only of the projections engaging the associated conveyor.

11. In a system for coating soles, a cementing machine, a conveyor spaced from the machine and traveling in the direction of delivery therefrom, and opposite belts interposed between the cementing machine and the conveyor and having projections which contact with coated and uncoated sides of the soles discharged from the machine, the projections upon one belt and which engage the uncoated sides being longer than those upon the other belt.

In testimony whereof I have signed my name to this specification.

SIDNEY J. FINN.